United States Patent
Hoeg

(10) Patent No.: US 8,972,269 B2
(45) Date of Patent: Mar. 3, 2015

(54) METHODS AND SYSTEMS FOR INTERFACES ALLOWING LIMITED EDITS TO TRANSCRIPTS

(75) Inventor: Steven Hoeg, Ontario (CA)

(73) Assignee: Adobe Systems Incorporated, San Jose, CA (US)

( * ) Notice: Subject to any disclaimer, the term of this patent is extended or adjusted under 35 U.S.C. 154(b) by 1543 days.

(21) Appl. No.: 12/325,321

(22) Filed: Dec. 1, 2008

(65) Prior Publication Data

US 2014/0249813 A1 Sep. 4, 2014

(51) Int. Cl.
*G06F 17/24* (2006.01)
*G10L 15/26* (2006.01)

(52) U.S. Cl.
USPC ............ 704/278; 704/235; 715/257; 715/271

(58) Field of Classification Search
CPC ................................. G06F 17/24; G10L 15/26
USPC .................. 704/235, 241, 251, 270, 275, 278;
715/255, 256, 271, 272
See application file for complete search history.

(56) References Cited

U.S. PATENT DOCUMENTS

| 4,914,704 | A | * | 4/1990 | Cole et al. ....................... 704/235 |
|---|---|---|---|---|
| 5,574,840 | A | * | 11/1996 | Kwatinetz et al. ............. 715/272 |
| 5,649,060 | A | | 7/1997 | Ellozy et al. |
| 5,794,249 | A | | 8/1998 | Orsolini et al. |
| 5,864,805 | A | * | 1/1999 | Chen et al. ..................... 704/235 |
| 6,055,246 | A | * | 4/2000 | Jones .............................. 370/503 |
| 6,505,153 | B1 | * | 1/2003 | Van Thong et al. ............ 704/211 |
| 6,535,848 | B1 | * | 3/2003 | Ortega et al. .................. 704/235 |
| 6,973,332 | B2 | * | 12/2005 | Mirkin et al. .................. 715/269 |
| 7,231,351 | B1 | | 6/2007 | Griggs |
| 7,962,331 | B2 | * | 6/2011 | Miller et al. ................... 704/215 |
| 2002/0156816 | A1 | * | 10/2002 | Kantrowitz et al. ........... 707/530 |
| 2002/0178002 | A1 | * | 11/2002 | Boguraev et al. .............. 704/235 |
| 2003/0037304 | A1 | * | 2/2003 | Burky ............................ 715/532 |
| 2004/0225963 | A1 | * | 11/2004 | Agarwal et al. ............... 715/530 |
| 2005/0102146 | A1 | * | 5/2005 | Lucas et al. .................... 704/270 |
| 2005/0114773 | A1 | * | 5/2005 | Thacker ......................... 715/541 |
| 2006/0036945 | A1 | * | 2/2006 | Radtke et al. .................. 715/708 |
| 2007/0208567 | A1 | * | 9/2007 | Amento et al. ................ 704/270 |
| 2008/0177536 | A1 | * | 7/2008 | Sherwani et al. .............. 704/235 |
| 2008/0177786 | A1 | * | 7/2008 | Faisman et al. ............. 707/104.1 |
| 2008/0275700 | A1 | * | 11/2008 | Bingley et al. ................ 704/235 |
| 2008/0319744 | A1 | * | 12/2008 | Goldberg ....................... 704/235 |
| 2009/0043576 | A1 | * | 2/2009 | Miller et al. ................... 704/231 |

* cited by examiner

*Primary Examiner* — Martin Lerner
(74) *Attorney, Agent, or Firm* — Kilpatrick Townsend & Stockton LLP

(57) ABSTRACT

A transcript interface for displaying a plurality of words of a transcript in a text editor can be provided and configured to receive a command to edit the transcript. Limited edits to data corresponding to the transcript can be made in response to commands received via the user interface module. For example, edits may be limited to selection of a single word in the text editor for editing via a given command. The edit may affect an adjacent word in some instances, such as when two adjacent words are merged. In some embodiments, data corresponding to the selected word of the transcript is changed to reflect the edit without changing data defining the relative timing of those words of the transcript that are not adjacent to the selected word.

21 Claims, 9 Drawing Sheets

METHODS AND SYSTEMS FOR INTERFACES ALLOWING LIMITED EDITS TO TRANSCRIPTS

TECHNICAL FIELD

The disclosure below generally relates to transcription software, particularly transcription software that supports transcript editing.

BACKGROUND

A transcript comprises a textual record of words that are uttered by one or more speakers or are otherwise audible. A transcript based on one or more audio components of an audio or audiovisual recording can be indexed to the recording so as to correlate words to particular points in time of the media recording. Various computer-based tools can support entry and use of indexed transcripts using data representing the words of the transcript and associating the words of the transcript with suitable time stamps or index values indicating the position of the words relative to one another and/or the recording. This may facilitate, for example, searching for words or phrases of interest in the transcript and accessing the recording for playback or other use at a point in the recording corresponding to the time stamp(s) of the words of interest.

If a user edits a portion of the transcript data, the user may make undesired changes to other portions of the transcript data that may make the transcript less usable or less reliable—for example, adding or removing words may cause words of the transcript (whether newly-added or not) to lack meaningful time codes.

SUMMARY

In some embodiments, edits to transcript metadata can be mediated by a user interface that restricts the type of edits that are available while presenting a transcript in a more user-friendly form. A computer system according to some embodiments can comprise a user interface module configured to provide a transcript interface for displaying a plurality of words of a transcript in a text editor and receive a command to edit the transcript. The system can comprise a transcript manager configured to edit a transcript dataset corresponding to the transcript in response to commands received via the user interface module. In some embodiments, the user interface is configured to limit editing commands provided via the text editor to selection of a single word in the text editor for editing via a given command. The edit may affect an adjacent word in some instances, such as when two adjacent words are merged.

Embodiments include a computer-readable medium embodying executable program code. The medium can comprise program code for accessing a transcript dataset representing a plurality of spoken words in an audio recording and for providing a transcript interface displaying a transcript in a text editor based on the transcript dataset. Further program code can be included for recognizing a command to edit the transcript provided via the interface, the command to edit the transcript comprising one of a limited set of edits based on selection of a single word in the text editor and for editing a data item in the transcript dataset in response to the recognized command.

A transcript can represent a plurality of words spoken in an audio recording and be defined by data specifying words and a timestamp or marker for each word. Embodiments include methods that comprise receiving data specifying a permitted edit to the selected word and changing the portion of the transcript related to the selected word of the transcript to reflect the edit without changing data defining the timestamp or marker for words in the transcript that are not adjacent to the selected word.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm here is generally considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

Figure 1:
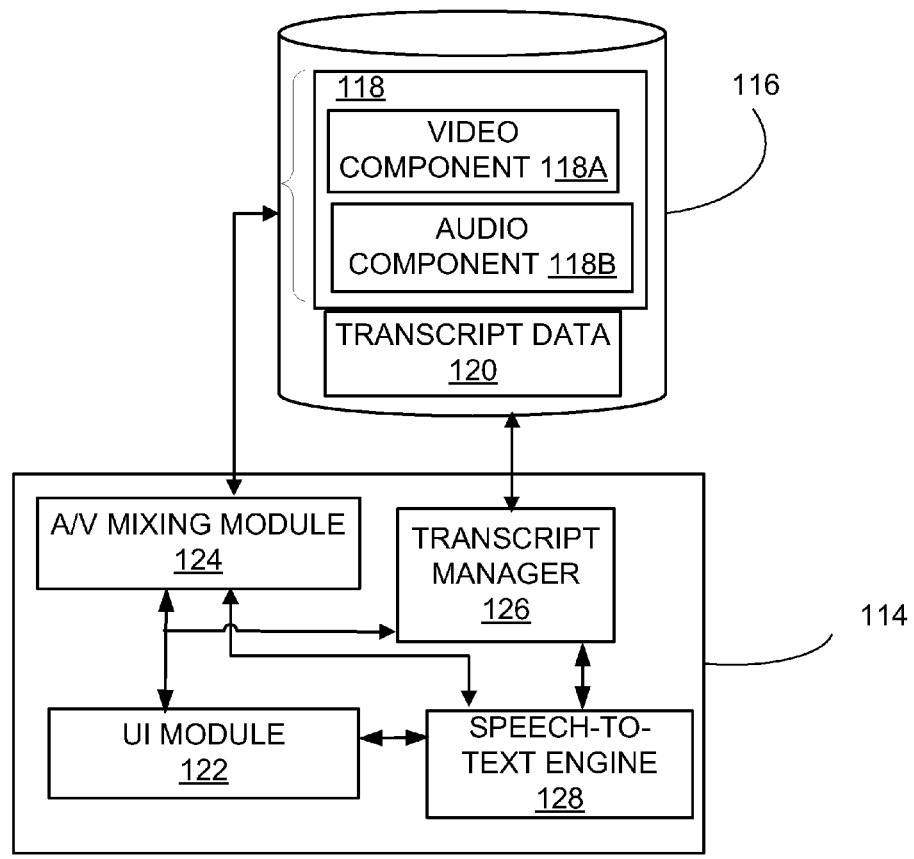
FIG. 1 is a block diagram illustrating an exemplary editing application featuring transcript functionality.
Figure 2:
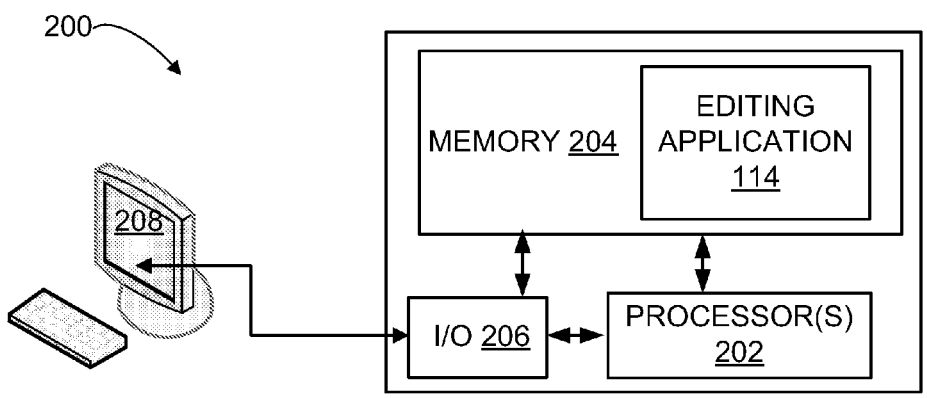
FIG. 2 shows an exemplary computer system providing an editing application.
Figure 9:
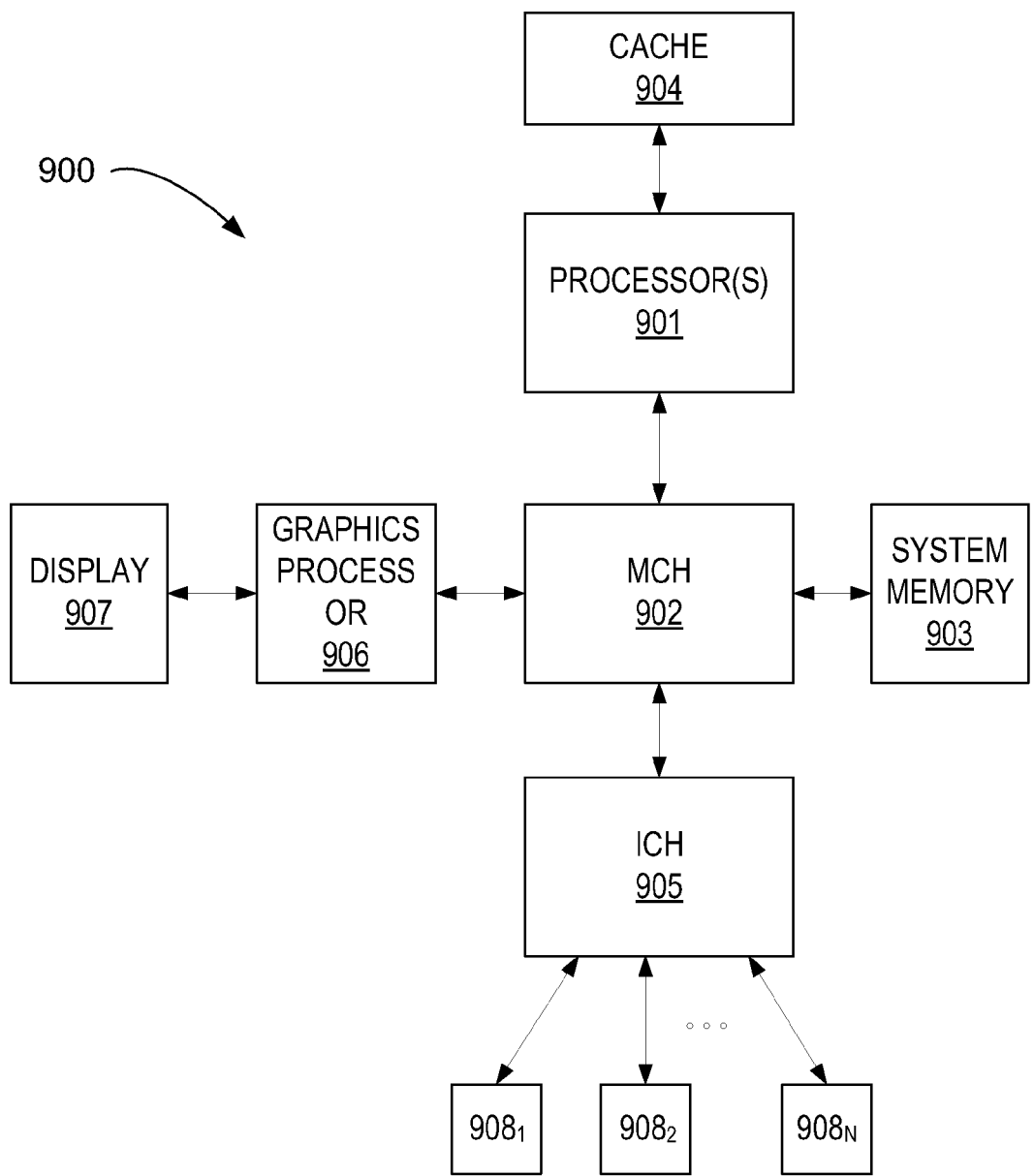
FIG. 9 illustrates an exemplary computing device that may be used in providing an application that includes transcript editing capabilities.

FIG. 1 is a block diagram illustrating an exemplary editing application 114 executable by a computer system 200 shown in FIG. 2, with further exemplary details of a computer system shown at 900 in FIG. 9. For instance, in FIG. 2, computer system 200 comprises one or more processors 202 which execute instructions accessed from memory 204 comprising one or more computer-readable media. Application 114 may comprise instructions stored in memory 204 and may reside in memory 204 when executed. I/O components 206 are used to interface with a keyboard and monitor 208 in this example to receive user input and provide output, although I/O components 206 could be used to access additional memory, remote storage, or other resources. Monitor 208 may be used to display a transcript interface, with the keyboard (and/or other suitable input devices such as a mouse or pen tablet) is used to provide input.

Turning back to FIG. 1, in this example, editing application 114 accesses data store 116 to obtain one or more clips 118 for editing. For instance, editing application 114 can comprise a nonlinear editor such as ADOBE® PREMIERE PRO®, available from Adobe Systems Inc. of San Jose, Calif. but configured to support transcript editing in accordance with the teachings herein. As another example, editing application 114 can comprise digital audio editor such as ADOBE® SOUNDBOOTH®.

In this example editing application is used to edit a clip 118. A "clip" refers to a media component, such as a set of data comprising one or more frames, segments, or other units, that includes recorded audio. A "clip" may comprise audiovisual data such as synchronized audio and video, as is the case in this example where clip 118 comprises a video component 118a and an associated audio component 118b retrieved from a data store 116. Data store 116 may be resident in memory 204 or may be another resource (e.g. a drive or mass storage) reachable by I/O components 206. Although this example depicts an audiovisual clip, the present subject matter can be used to edit transcripts associated with an audio clip alone or otherwise independent from a video component.

Clip 118 is associated with transcript data 120. For example, transcript data 120 may comprise metadata embedded in the file(s) of clip 118 or included as a separate file with a suitable indicator of its association with clip 118. Transcript data can comprise a transcript dataset that correlates a plurality of words of a transcript to respective timestamps in clip 118. For example, the dataset may comprise a series of data items that each associate a word of the transcript to a time marker and a duration.

Transcript manager 126 can be used to access transcript metadata and (in conjunction with UI module 122 and audio-visual mixing module 124) provide a transcript in suitable form for display or other output (e.g., printing). For example, the index values for the transcript data items can be used by transcript manager 126 to put the words in a proper order for display.

If transcript manager 126 determines that a clip lacks transcript metadata, then transcript metadata for a clip may be generated using speech-to-text engine 128, which applies speech recognition techniques to provide transcript metadata indicating a time marker and duration for words spoken (or otherwise audible) in audio component 118b.

Although spoken words are referenced in several examples herein, the subject matter is not limited to transcripts comprising only spoken words or to transcripts comprising only words from a human voice. For instance, a transcript may be generated from other audible components such as computer-generated speech. A transcript may indicate non-speech components, such as the presence of music and/or sound effects.

Figure 3:
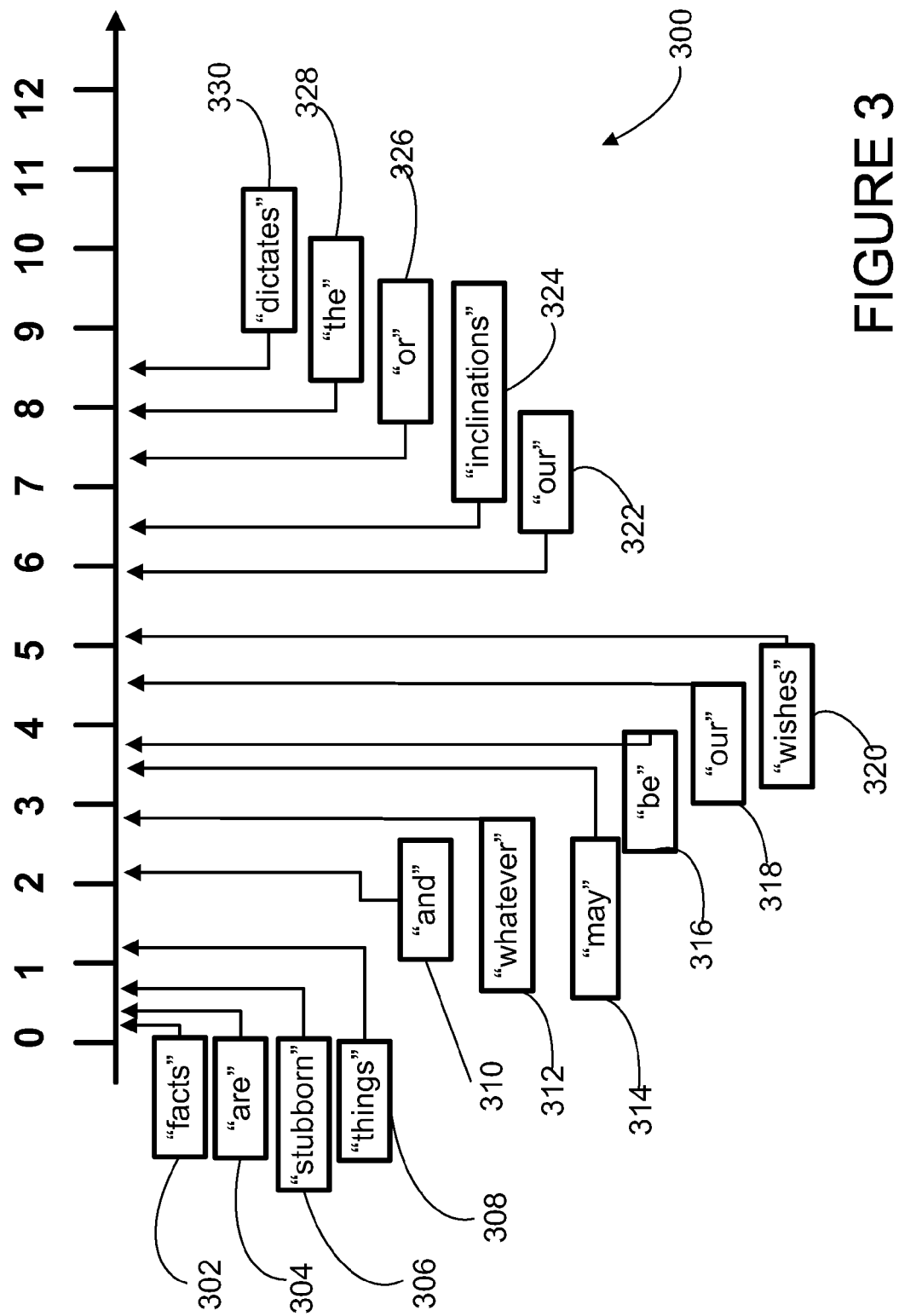
FIG. 3 is a timeline illustrating a relative timing between exemplary words of a quote for which a corresponding transcription will be edited.

For purposes of example, consider an audio clip in which the speaker recites, "Facts are stubborn things; and whatever may be our wishes, our inclinations, or the dictates of our passion, they cannot alter the state of facts and evidence." FIG. 3 depicts a timeline 300 that illustrates the timing of the first fifteen words of the quote relative to one another based on a time scale. The timescale may be in seconds or other suitable time markers such as frame counts of an audiovisual clip. As can be seen from the timeline, the speaker pauses between portions of the quote (e.g., between "things" (308) and "and" (310); between "wishes" (320) and "our" (322); and between "inclinations" (324) and "or" (326)).

A transcript dataset that may be generated from the words depicted in FIG. 3 is shown below in Table 1. However, Table 1 includes simulated errors that may result during the speech-to-text conversion process. As another example, the transcript dataset may have been generated by a stenographer who made errors. The table also includes reference numerals to cross-reference portions of the transcript dataset from the "true" words indicated in FIG. 3.

TABLE 1

Transcript Errors

| (FIG. 2 Ref.) | Word |
|---|---|
| 302 | facts |
| 304 | are |
| 306 | stubborn |
| 308 | things |
| 310 | and |
| 312 (first syllable) | what |
| 312 (second syllable) | ever |
| 314/316 (combined) | maybe |
| 318 | (omitted) |
| 320 (first syllable) | wish |
| 320 (second syllable) | is |
| 322 | our |
| 324 | inclinations |
| 326 | or |
| 328 | the |
| 330 | dictates |

In this example, the errors are as follows: the individual words "may" (44) and "be" (46) were transcribed as a single word "maybe"; the word "our" (48) was not transcribed; and the single word "wishes" (50) has been transcribed as two words ("wish" and "is"). For example, the speaker of the quote may have spoken "may be" in rapid succession while drawing out "wishes." As another example, audio quality may have varied over the length of time the quote was recorded.

Regardless of the source of the error, an accurate transcript may be needed. For instance, if the transcript metadata is to be used for closed-captioning or subtitling a media presentation, the text used to generate the captions or subtitles should be accurate. If the transcript is used by an editing tool to allow a user to search for certain words or phrases in a media clip (e.g., to find a certain portion of a long clip), then accuracy is needed for the transcript to be useful for that purpose. As another example, a transcript may be intended for official purposes (e.g., a hearing or deposition transcript) that demand strict fidelity to the words actually spoken.

Certain transcript tools may be overly restrictive or overly permissive with regard to user changes to transcript metadata. For example, a transcript may comprise a set of words indexed to time markers. Some tools may allow a rigid interface that allows only editing single words and/or their time markers at a time. This may be counterintuitive if the word cannot be viewed in context.

As another example, a user may be provided an editing interface comprising a timeline view similar to FIG. 3 and may be permitted to adjust time markers for words, insert new time markers, and change words. This may introduce problems, however, as a user may inadvertently change time markers and words that are correctly transcribed and placed. Additionally, to view a complete set of text, the user may need to zoom out or otherwise adjust display characteristics; this may increase the possibility of error in some cases.

Instead, user edits to transcript metadata can be mediated by a user interface that restricts the type of edits that are available while presenting the text in a more user-friendly interface. In the example of FIG. 1, UI module 122 is configured to provide such an interface. In some embodiments, the restrictions can be implemented in light of the expected types of errors for speech transcription to avoid presenting too many options to a user or presenting too many opportunities for inadvertently altering transcript metadata for portions of the transcript that are not intended to be changed.

For example, the restrictions may be limited to allowing changes or deletions to a single word at a time. More advanced edits, such as combining words or splitting single words into two words, can be implemented as a series of single-word edits. The interface may be configured so that changes to transcript metadata related to one word do not change transcript metadata for other words. In some embodiments, only the transcript text is presented and the user is not permitted to change time markers at all. Thus, editing capability can be provided with a much-reduced risk that a user will inadvertently damage a transcript.

Figure 4:
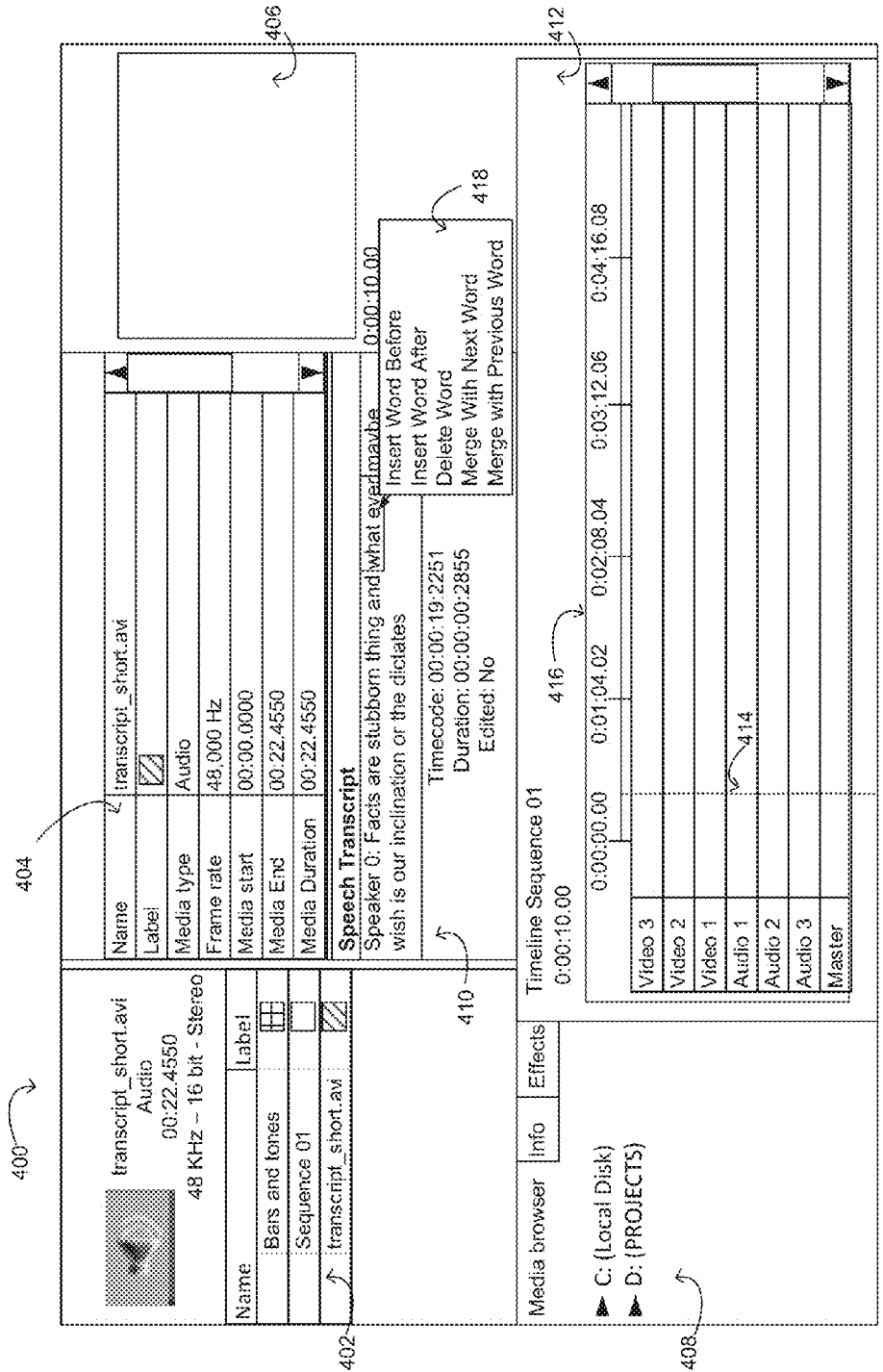
FIG. 4 provides an example of a user interface for an application that includes transcript editing capabilities.

FIG. 4 provides an example of a user interface 400 for an application that includes transcript editing capabilities. In this example, user interface 400 includes an identifier panel 402 providing information about a clip being edited. Panel 404 includes file information such as the media type, frame rate, duration, and file location. A preview pane 406 is included to display video content associated with clips that comprise video content. In this example, the clip is audio-only and so preview pane 406 is empty. Browser panel 408 allows a user to select from different data resources (e.g. disks, partitions, etc.) to locate media units to edit.

In this example, interface 400 is provided by a nonlinear editing tool and includes a timeline view 412 showing a plurality of tracks that may be used to mix components together. In this example a single component 414 is depicted relative to a timeline 416. Other mixing controls in this example allow a user to select gain levels, add transition effects, and the like.

Interface 400 includes a transcript interface 410 that provides a transcript for the selected clip based on accessing transcript metadata. For example, a clip may have embedded metadata that includes transcript metadata. As another example, transcript metadata may be added to or associated with a clip when the clip is imported into or selected for use by the editing tool.

In some embodiments, transcript interface 410 displays a transcript for the selected clip in a more user-friendly format. Specifically, the transcript is displayed as a series of paragraphs in a text editor similar to the appearance of text in a word processing application. This may more closely approximate how the transcript may be reviewed in some circumstances and also allows particular words and phrases to be viewed in context rather than individually or as part of a timeline.

Transcript interface 410 may be varied in size. For example, a user may be able to click on a part of the interface to expand the view in order to see all of a transcript. As another example, the portion of the transcript that is in view may be synchronized with the point of playback for the currently-selected clip and automatically scroll while the clip is played.

Transcript interface 410 can include additional information based on the transcript metadata. For instance, when a user selects a word its corresponding time marker, duration, and/or other information may be provided. This example further shows whether a word displayed in transcript interface has been edited.

Transcript interface 410 is also configured to receive user commands indicating edits to the transcript. In some embodiments, the types of available commands are restricted. For example, although the text may be displayed in a word-processor-like format, the user may be prohibited from freely clicking in the transcript display area and typing. Instead, in some embodiments, only one word at a time may be selected and additional input (e.g. menu selections) may be required before certain edits are allowed.

An example of a transcript edit selection menu 418 also appears in FIG. 4. For example, selection menu 418 may be rendered in response to selection of one or more words depicted in transcript interface 410 and may provide a limited set of options for editing the selected word(s) to allow for minor edits while preventing a user from inadvertently altering other transcript data while making edits.

Figure 5:
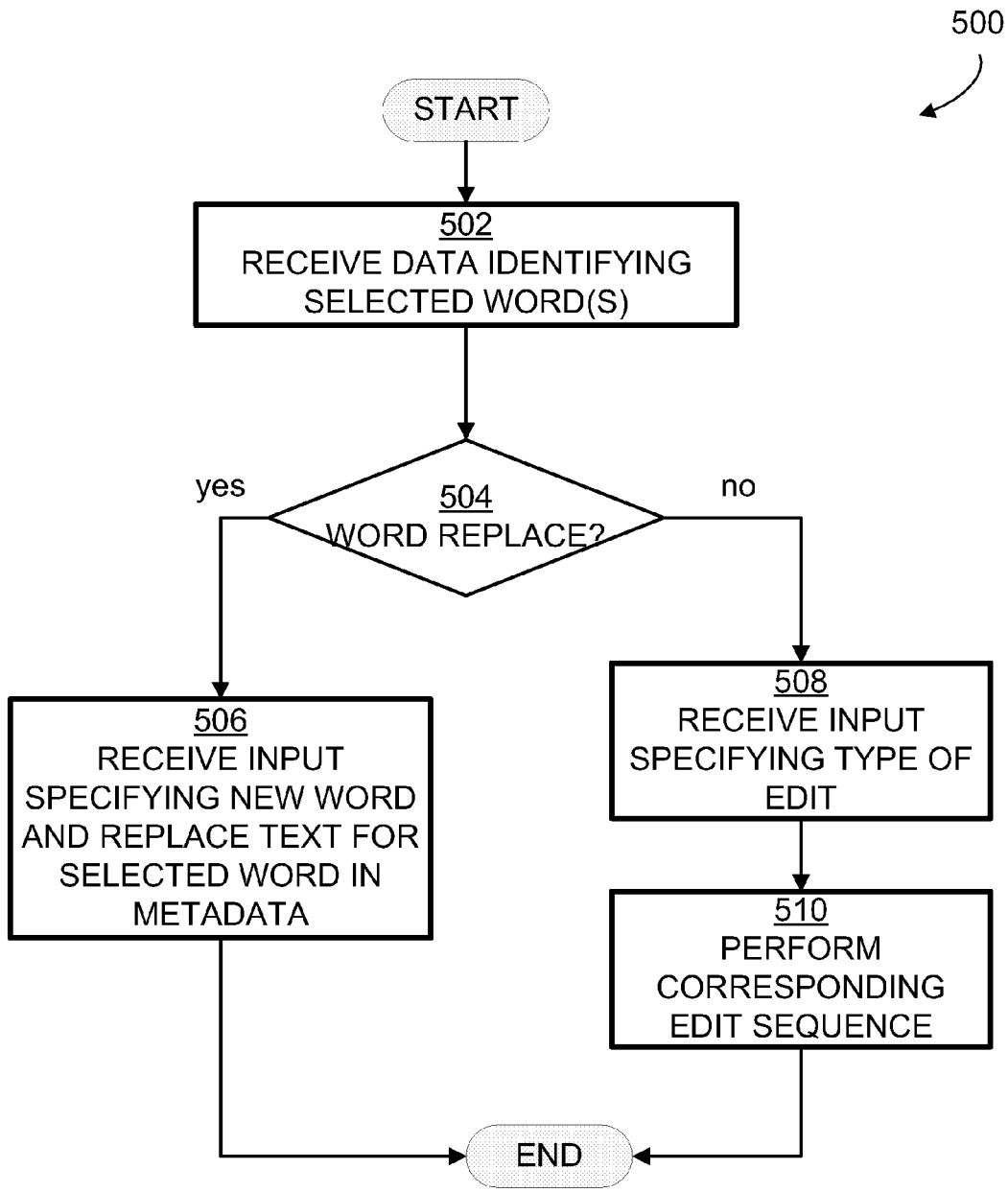
FIG. 5 is a flowchart illustrating an exemplary method for editing transcript metadata via an interface.

FIG. 5 is a flowchart illustrating an exemplary method 500 for editing transcript metadata via an interface such as transcript interface 410 discussed above. For example, method 500 may be implemented by UI module 122 to interpret user input and provide suitable output in conjunction with transcript manager 126 to update transcript metadata to reflect the indicated edits.

Block 502 represents receiving data identifying a selected word. At block 504, the method comprises determining whether the edit is simply replacing one word with another. For example, the method may be implemented so that if user interface module 122 receives a gesture comprising a right click on a word, the word is going to be replaced. If the word is to be replaced, then at block 506, the method comprises receiving input specifying the new word and replaces the text in the metadata corresponding to the selected word. For example user interface module 122 may highlight the word in transcript interface 410 and allow the user to input replacement text. Note that no time markers, word durations, or other data are affected by a word replacement.

For example, in the discussion in conjunction with FIG. 8A below, "maybe" is replaced with "may" at 802-804 and in FIG. 8B, "wish" is replaced with "wishes" at 808. The corresponding text in the metadata can simply be changed to "may" and "wishes," respectively, when the edits are made by transcript manager 126, for example.

If a more complex edit is indicated, then at block 504 the method moves to block 508 where input specifying the type of edit is received. For example, user interface module 122 may recognize a right-click gesture on a word in transcript interface 410 as indicating a complex edit and spawn menu 418 to allow a user to select an edit to make. At block 510, an editing sequence corresponding to the selection is performed.

Figure 6:
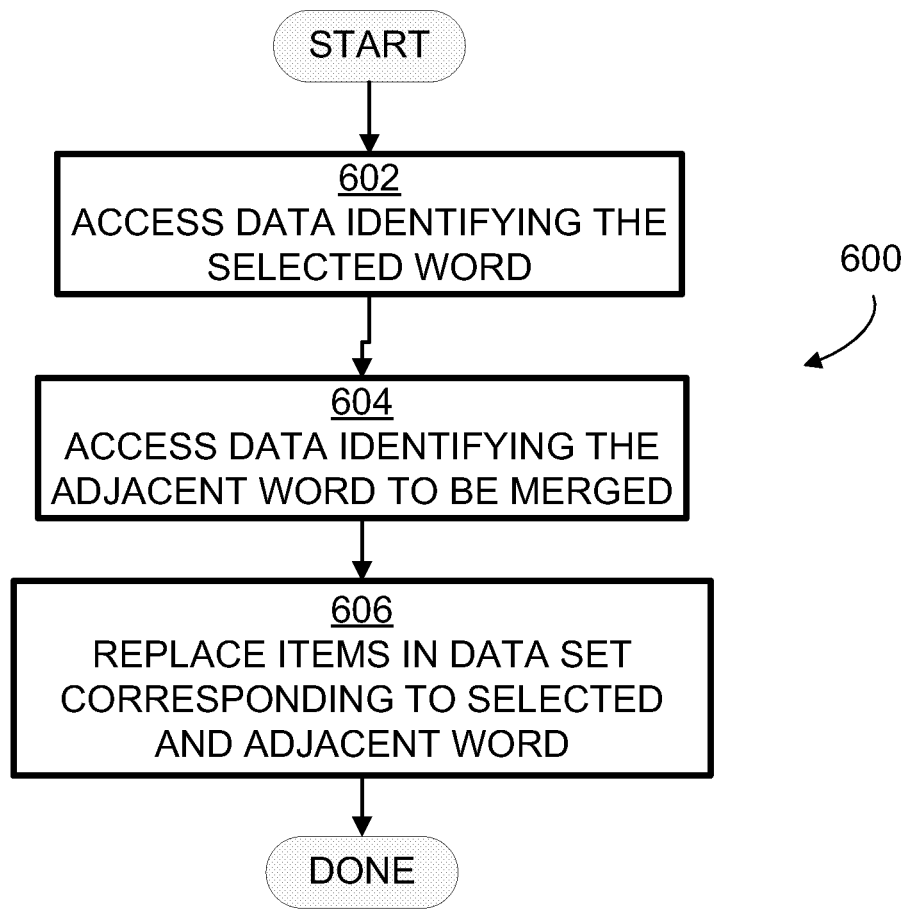
FIG. 6 illustrates an exemplary editing sequence for merging a word with an adjacent word.

FIG. 6 illustrates an exemplary editing sequence 600 for merging a word with an adjacent word. Block 602 represents accessing data identifying a selected word and block 604 represents accessing data identifying a word adjacent to the selected word to be merged with the selected word. For instance, the word may be identified by user interface module 122 receiving a right click and selection of a merge option as shown in FIG. 8A below at 802, where the user combines "what" and "ever" by selecting one of the words and a merge option (e.g., "merge with previous word" or "merge with next word"). Alternatively, the interface may allow selection of two adjacent words and input of a "merge" command.

At block 606, items in the transcript data set that correspond to the selected and adjacent word are replaced with a single data item for the combined word. This may be handled, for example, by transcript manager 126 based on input relayed from user interface module 122. The transcript metadata may be updated to include the text of the combined word, a timestamp corresponding to the start of the combined word, and a duration inferred from the duration of the words that are combined.

The timestamp for the start of the word can correspond to the earliest timestamp as between the two words to be combined. The duration may comprise the sum of the durations of the words. In some embodiments, the duration of the combined word also includes any gap between the combined words. For example, the "gap" may be identified as the difference between the end of the earlier word (i.e. the word with the earliest timestamp) and the start of the later word. The end of the earlier word can be determined by summing its timestamp and duration.

The text of the combined word may be obtained by combining the text of the selected word and the adjacent word. When combining the text, the text of the earlier word can precede the text of the other word.

Figure 7:
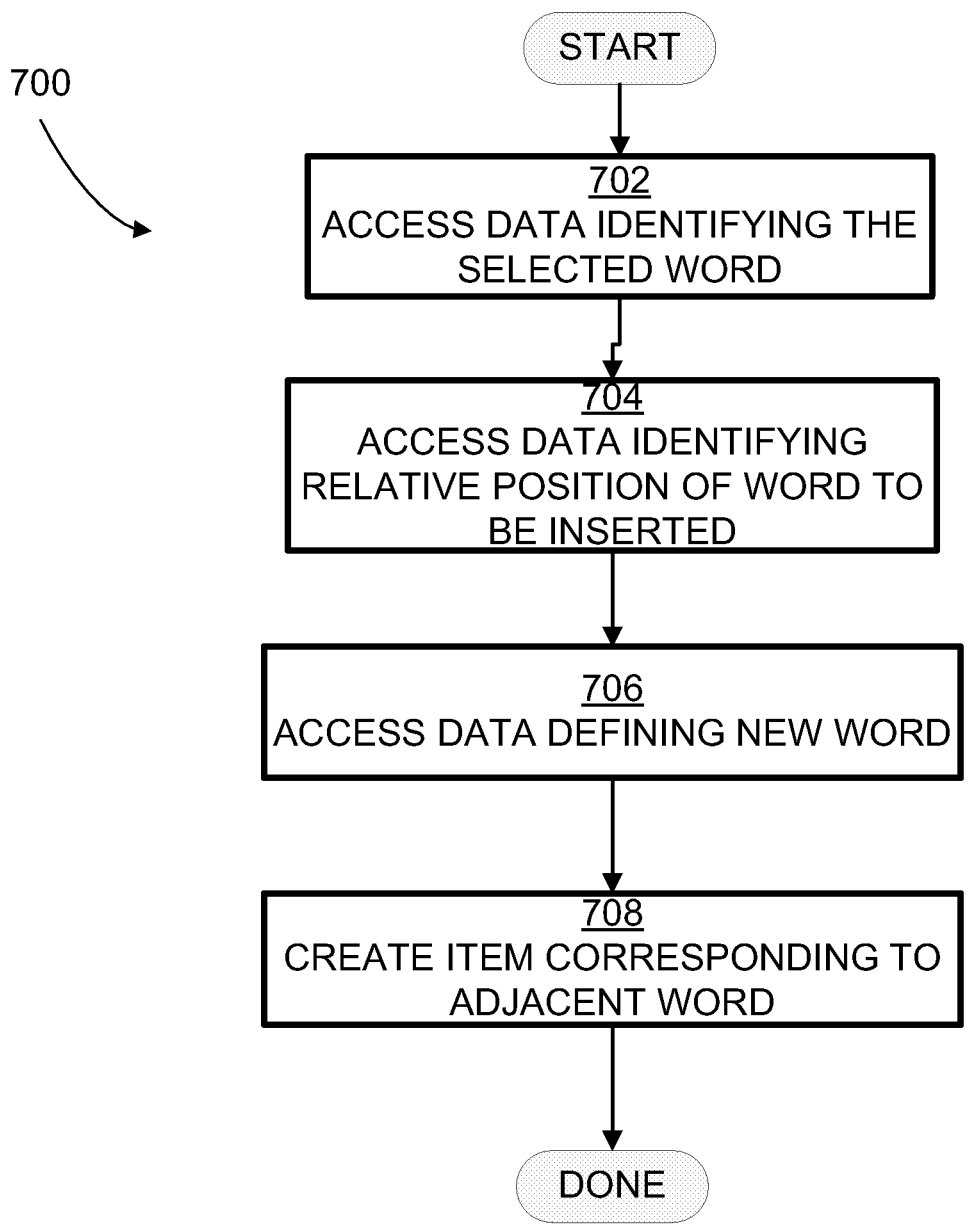
FIG. 7 illustrates an exemplary sequence for inserting a word.

FIG. 7 illustrates an exemplary sequence 700 for inserting a word. Block 702 represents accessing data identifying the selected word and block 704 represents accessing data identifying the relative position of a word to be inserted. This may correspond to input recognized by user interface module 122 via user clicks and menu selections. For example, in FIG. 8A at 804 a selected word is right-clicked and the relative position is determined from a command (insert word after) chosen from menu 418. In FIG. 8B at 806 a selected word is right-clicked and the relative position of the word to be inserted is determined from a command (insert word before) chosen in menu 418.

Based on user input provided to transcript manager 126 via user interface module 122, transcript manager 126 can update the transcript dataset. Block 706 represents accessing data defining the new word. For example, a text entry box may be provided or a cursor may be indicated before or after the selected word where a user can type or otherwise input the word to be inserted.

Block 708 represents creating an item in the transcript dataset corresponding to the new word so that the new word is adjacent to the selected word. For example, the transcript metadata may be updated to include the text of the new word, a timestamp corresponding to the start of the new word, and a duration for the new word. In some embodiments, the transcript metadata includes an order for each data item associated with a word, with the order of the words in the transcript specified by the order or other position in the transcript metadata structure. The data item for the inserted word can be placed at an appropriate position in the transcript metadata so that the inserted word appears in the proper location relative to the adjacent words.

The timestamp and duration values may depend on the particular context under which a word is inserted. In some embodiments, transcript metadata for a word that is adjacent to the selected word prior to insertion of the new word may be accessed to determine if there is a gap between the adjacent word and the selected word. This may be determined based on the starting timestamps and indicated durations for the words.

For instance, assume a sequence of words "A . . . C . . . E" to be edited. If a new word "B" is to be inserted before a selected word "C", the new word's starting timestamp can be set to equal a value determined from the sum of the starting timestamp of "A" (i.e. the word that is presently adjacent to the selected word) plus the duration of "A." The value may be rounded to the nearest timestamp unit if needed. Thus, "B" will have the first available timestamp after "A" ends.

On the other hand, if a new word "D" is to be inserted after selected word "C," the new word's starting timestamp can based on the sum of the starting timestamp for "C" plus the duration of "C" (i.e. the starting timestamp of the selected word plus the selected word's duration).

In some embodiments, the duration of a new word is set to equal the "gap" between the word preceding the new word and the word following the existing word. However, the duration of the new word may be set to zero when no "gap" is available between a word that precedes a word to be inserted and a word that follows the word to be inserted. This reflects an assumption that a complete miss by a speech-to-text engine will be rare. Instead, the assumption is that in most cases the speech-to-text engine will include some sort of word and time marker approximating the sound and duration of the sound.

Use of a duration of zero for new words may facilitate inserting multiple words one at a time. For example, the sequence after editing may comprise "A . . . B . . . C . . . D . . . E." If a word is to be inserted between A and B or B and C, for instance, the word will have the same starting timestamp as B and a duration of zero. The structure of the transcript data can preserve insertion order—for example, items inserted earlier can appear before items inserted later—and that can allow for the proper order of the words to be maintained.

The user interface/transcript manager may implement special restrictions for inserting words. For example, inserting a word prior to the first word of a transcript or after the last word of a transcript may be prohibited, since the resulting word would have a timestamp of zero and zero duration or a timestamp at the end of the recording, respectively, and this may cause errors for certain transcript viewers.

Another "advanced" editing operation may comprise deleting a word. This option may be included in menu 418 to avoid accidental deletion of a word since use of menu 418 may require multiple gestures by a user. When a word is deleted, the transcript data item corresponding to the word is removed from the transcript metadata. A dialog or confirmation may be presented to a user to confirm deletion prior to removing data from the transcript.

Figure 8A:
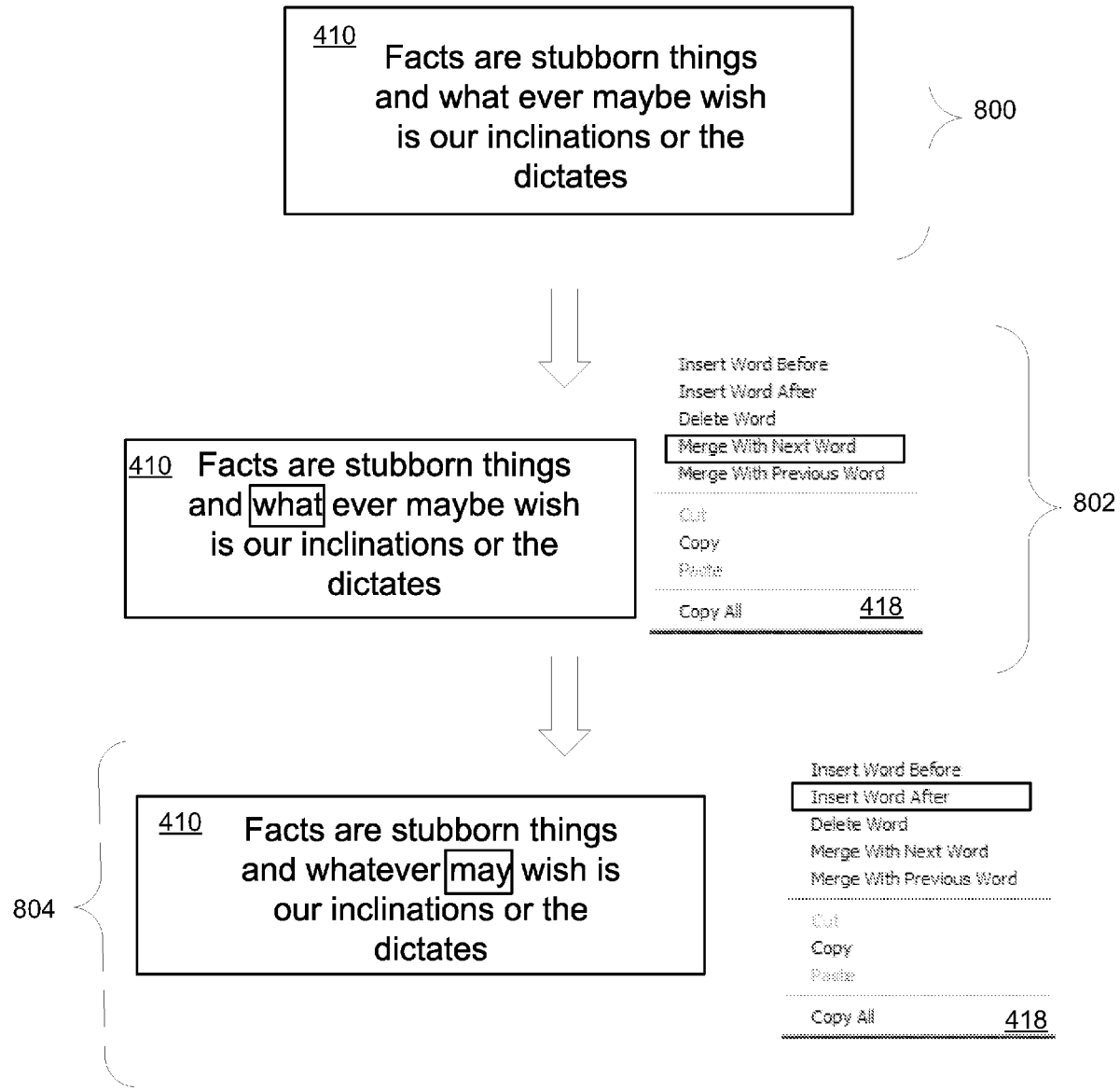
FIGS. 8A and 8B illustrate an example of user interface components during editing of a transcript.
Figure 8B:
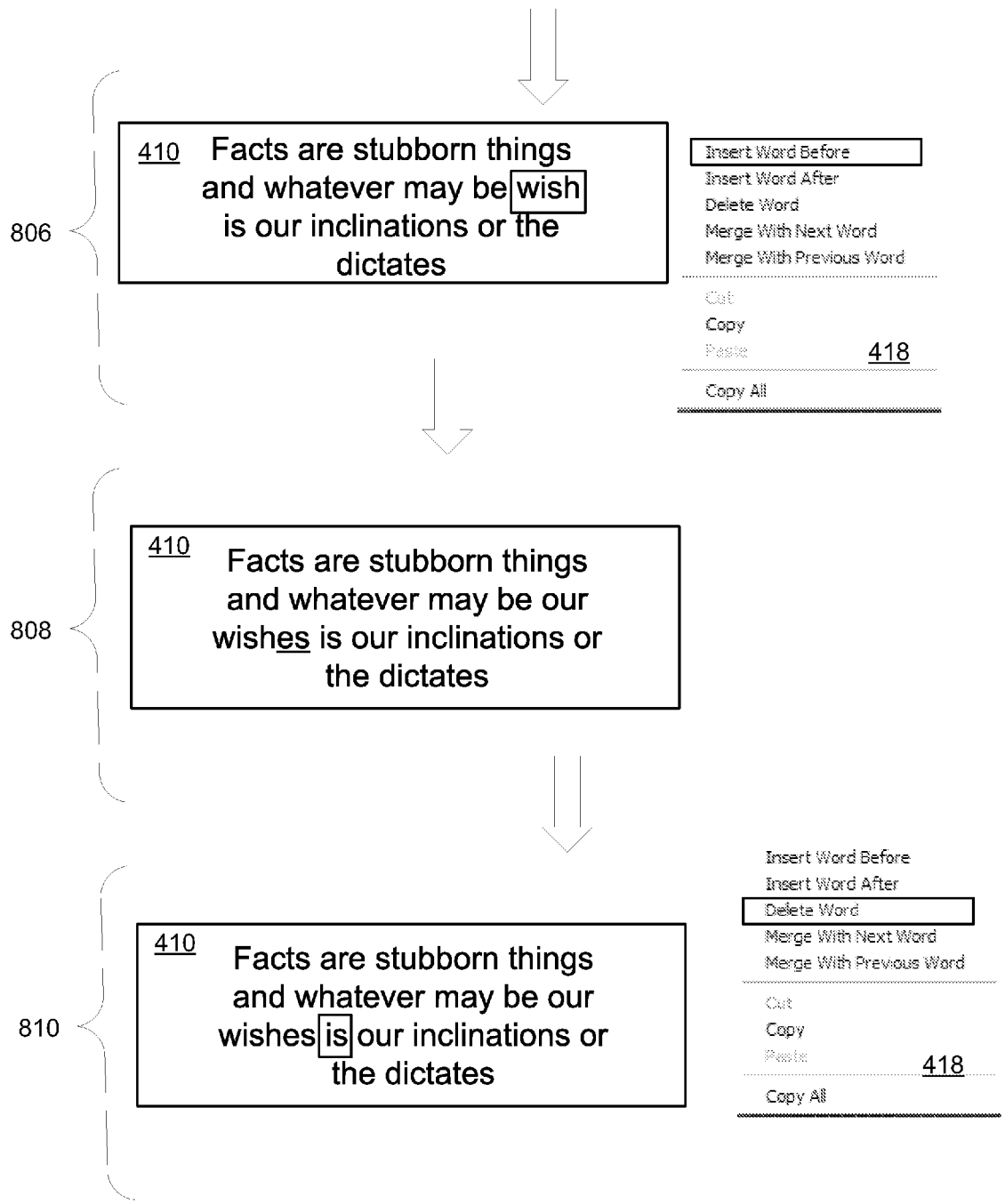

FIGS. 8A and 8B illustrate an example of editing a transcript in a series of steps, each step depicting a plurality of words of a transcript appearing in a text editor of transcript interface 410 of FIG. 4. The transcript interface is configured to allow limited edits that ultimately change the transcript metadata without adversely affecting the transcript metadata for unedited words.

As shown at 800, transcript interface 410 initially displays the transcript (with errors) generated from the sequence of words depicted in FIG. 3. The transcript may be maintained in a dataset comprising an entry for each word noting the word's text, timestamp, and duration. Prior to editing, the starting timestamp of a word may not necessarily be equal to the starting timestamp of a previous word plus the previous word's duration since a word's duration refers to the length of time that sound was registered for the word. Thus, the duration values alone may not reflect pauses or silence between words.

TABLE 2

Transcript Dataset Showing Errors

| Text | Timestamp | Duration |
| --- | --- | --- |
| facts | 0.23 | 0.1 |
| are | 0.33 | 0.1 |
| stubborn | 0.68 | 0.2 |
| things | 1.25 | 0.3 |
| and | 2.25 | 0.1 |
| what | 2.8 | 0.2 |
| ever | 3.1 | 0.3 |
| maybe | 3.4 | 0.5 |
| wish | 5.1 | 0.2 |
| is | 5.3 | 0.2 |
| our | 6.0 | 0.2 |
| inclinations | 6.3 | 0.3 |
| or | 7.3 | 0.1 |
| the | 7.5 | 0.1 |
| dictates | 7.7 | 0.2 |

As shown at 802 in FIG. 8A, the user may determine that the phrase "what ever" should be a single word "whatever" and implement a suitable edit via interface 410. While several options may be available, in this example the user highlights "what" and spawns edit selection menu 418 and selects "merge with next word". For example, the user may be able to spawn the menu by right-clicking after selecting the word.

For example, the portion of the transcript metadata corresponding to "what" and "ever" are shown below:

TABLE 3

Excerpt of Transcript Dataset Showing Errors

| Text | Timestamp | Duration |
| --- | --- | --- |
| and | 2.25 | 0.1 |
| what | 2.8 | 0.2 |
| ever | 3.1 | 0.3 |
| maybe | 3.4 | 0.5 |
| wish | 5.1 | 0.2 |
| is | 5.3 | 0.2 |
| our | 6.0 | 0.2 |
| inclinations | 6.3 | 0.3 |

The data items for the selected word "what" and next-adjacent word "ever" may be accessed. A new data item may be created in the transcript metadata having a starting timestamp of 2.8 (from the original "what" data item) and a duration of 0.6 based on combining durations of the data items (0.2+0.3) plus the "gap" (0.1) between "what" and "ever." The 0.1 gap was determined by finding the difference between the end of "what," inferred to equal 3.0 from its start at 2.8 and duration of 0.2, and the beginning of "ever" at 3.1. The transcript dataset as updated is excerpted below in Table 4:

TABLE 4

Excerpt of Transcript Dataset After Combining "What" and "Ever"

| Text | Timestamp | Duration |
| --- | --- | --- |
| and | 2.25 | 0.1 |
| whatever | 2.8 | 0.6 |
| maybe | 3.4 | 0.5 |
| wish | 5.1 | 0.2 |
| is | 5.3 | 0.2 |
| our | 6.0 | 0.2 |
| inclinations | 6.3 | 0.3 |

At 804, two edits are represented. For example, the user may highlight or click on "maybe" and simply replace the word with "may" without the use of a selection menu. This will simply replace "maybe" with "may" in the text entry for the corresponding data item. Then, as shown by menu 418, the user can select "may" and the option "insert word after" to add the word "be."

The transcript metadata will be updated to add a new word with the text "be." Its starting timestamp can equal the first available time unit after the end of the previous word "may" as inferred from the starting timestamp and duration of "may," and its duration is set to span the gap between the prior word "may" and the following word "wish" as set forth in Table 5 below:

TABLE 5

Excerpt of Transcript Dataset After Correcting "maybe" and Adding "be"

| Text | Timestamp | Duration |
| --- | --- | --- |
| and | 2.25 | 0.1 |
| whatever | 2.8 | 0.6 |
| may | 3.4 | 0.5 |
| be | 3.9 | 1.2 |
| wish | 5.1 | 0.2 |
| is | 5.3 | 0.2 |
| our | 6.0 | 0.2 |
| inclinations | 6.3 | 0.3 |

Turning to FIG. 8B, the user may add "our" by highlighting "wish" and selecting the option "insert word before" as shown at 806. Since the duration of "be" occupies the entire gap before "wish," the inserted word "our" will receive the same time stamp as "wish" and zero duration. However, its data item can be placed in the transcript metadata to preserve the proper order of the words as shown in Table 6 below:

TABLE 6

Excerpt of Transcript Dataset After Adding "our"

| Text | Timestamp | Duration |
| --- | --- | --- |
| and | 2.25 | 0.1 |
| whatever | 2.8 | 0.6 |
| may | 3.4 | 0.5 |

TABLE 6-continued

Excerpt of Transcript Dataset After Adding "our"

| Text | Timestamp | Duration |
|---|---|---|
| be | 3.9 | 1.2 |
| our | 3.9 | 0 |
| wish | 5.1 | 0.2 |
| is | 5.3 | 0.2 |
| our | 6.0 | 0.2 |
| inclinations | 6.3 | 0.3 |

808 represents another single-word edit where the user selects "wish" and adds "es" (represented as underlining for purposes of illustration). At 810, the user selects the word "is" and the option "delete word" from menu 418, which removes the entry for "is" from the metadata. Thus, after the final edit, transcript interface 410 (and the transcript metadata) will include the correct text, "Facts are stubborn things and whatever may be our wishes our inclinations or the dictates . . . " as originally spoken as indicated below without changes to the metadata for those words that were not edited:

TABLE 7

Transcript Dataset After Edits

| Text | Timestamp | Duration |
|---|---|---|
| facts | 0.23 | 0.1 |
| are | 0.33 | 0.1 |
| stubborn | 0.68 | 0.2 |
| things | 1.25 | 0.3 |
| and | 2.25 | 0.1 |
| whatever | 2.8 | 0.6 |
| may | 3.4 | 0.5 |
| be | 3.9 | 1.2 |
| our | 3.9 | 0 |
| wishes | 5.1 | 0.2 |
| our | 6.0 | 0.2 |
| inclinations | 6.3 | 0.3 |

The example above was for purposes of illustration only. A user could have used a different order for editing or may have achieved the edits in a different way. For example, with regard to "wish is," the user could have combined "wish" and "is" and then corrected the spelling of the combined word "wishis" via a second edit.

FIG. 9 illustrates an example of computing device 900 suitable for implementing embodiments discussed above. For example, computing computer system 200 may utilize one or more variants of the computing device shown in FIG. 9. In this example, the computing device includes: 1) one or more processors 901; 2) a memory control hub (MCH) 902; 3) a system memory 903 (of which different types exist such as DDR RAM, EDO RAM, etc,); 4) a cache 904; 5) an I/O control hub (ICH) 905; 6) a graphics processor 906; 7) a display/screen 907 (of which different types exist such as Cathode Ray Tube (CRT), Thin Film Transistor (TFT), Liquid Crystal Display (LCD), DPL, etc.); and/or 8) one or more I/O devices 908.

The one or more processors 901 execute instructions in order to perform whatever software routines the computing system implements and may correspond to processor(s) 202 of FIG. 2. The instructions frequently involve some sort of operation performed upon data. Both data and instructions are stored in system memory 903 and cache 904, which are examples of the generalized memory 204 shown in FIG. 2. Cache 904 is typically designed to have shorter latency times than system memory 903. For example, cache 904 might be integrated onto the same silicon chip(s) as the processor(s) and/or constructed with faster SRAM cells while system memory 903 might be constructed with slower DRAM cells. By tending to store more frequently used instructions and data in the cache 904 as opposed to the system memory 903, the overall performance efficiency of the computing system improves.

System memory 903 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 903 prior to their being operated upon by the one or more processor(s) 901 in the implementation of a software program. Similarly, data that a software program determines should be sent from the computing system to an outside entity through one of the computing system interfaces, or stored into an internal storage element, is often temporarily queued in system memory 903 prior to its being transmitted or stored.

The ICH 905 is responsible for ensuring that such data is properly passed between the system memory 903 and its appropriate corresponding computing system interface (and internal storage device if the computing system is so designed). The MCH 902 is responsible for managing the various contending requests for system memory 903 access amongst the processor(s) 901, interfaces and internal storage elements that may proximately arise in time with respect to one another.

One or more I/O devices 908 are also implemented in a typical computing system. I/O devices generally are responsible for transferring data to and/or from the computing system (e.g., a networking adapter); or, for large scale nonvolatile storage within the computing system (e.g., hard disk drive). ICH 905 has bi-directional point-to-point links between itself and the observed I/O devices 908, and in this respect may represent an example of generalized I/O components 206 of FIG. 2.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into subblocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer system comprising:
a processor configured to execute instructions accessed from an application stored in a non-transitory computer readable medium, the application comprising:
an interface module configured to provide a transcript interface for displaying a plurality of words of a transcript and receive a command identifying a selected word of the transcript and a desired edit to the transcript from a plurality of permitted edits; and
a transcript manager module configured to edit a transcript dataset corresponding to the transcript in response to the command, wherein the transcript dataset comprises the plurality of words and data correlating each of the plurality of words to a respective point in time, wherein editing the transcript dataset comprises merging the selected word with an adjacent word by creating a new data item comprising the text of the selected word and the adjacent word combined and a time index marker corresponding to an earlier point in time as between the selected word and the adjacent word.

2. The computer system set forth in claim 1, wherein the plurality of words and each respective point in time are associated with a media component retrieved from the non-transitory computer readable medium.

3. The computer system set forth in claim 2, wherein the media component comprises an audio track of an audiovisual recording.

4. The computer system set forth in claim 1, wherein the interface module is further configured to receive an additional command to edit the transcript that comprises selection of a deletion option; and
wherein the transcript manager module is configured to remove a data item corresponding to the selected word from the transcript dataset in response to the additional command.

5. The computer system set forth in claim 1, wherein the transcript manager module is configured to remove the data items for the selected word and the adjacent word from the transcript dataset.

6. The computer system set forth in claim 1, wherein generating a new data item further comprises determining respective durations of the selected word and the adjacent word, wherein the new data item further comprises an additional duration equal to the sum of the respective durations of the selected word and the adjacent word.

7. A non-transitory computer-readable medium embodying executable program code comprising:
program code for providing a transcript interface, the transcript interface displaying a plurality of words of a transcript;
program code for recognizing a command to edit the transcript provided via the transcript interface, wherein the command comprises a selection of one of a limited set of edits and is restricted to a selection of a single word of the transcript; and
program code for editing the transcript in response to the command, wherein editing the transcript comprises merging a selected word with an adjacent word by creating a new data item comprising the text of the selected word and the adjacent word combined and a time index marker corresponding to an earlier point in time as between the selected word and the adjacent word.

8. The computer-readable medium set forth in claim 7, further comprising:
program code for recognizing an additional command comprising a selection of a word and input of replacement text; and
program code for the transcript by changing the text of the selected word to match the text inputted via the transcript interface.

9. The computer-readable medium set forth in claim 7, wherein the transcript is associated with an audio recording that comprises an audio track in a video file.

10. The computer-readable medium set forth in claim 7, further comprising:
program code for recognizing an additional command comprising a selection of a word and a selection of an option to delete the word; and
program code for editing the transcript by removing a data item corresponding to the selected word from the transcript.

11. The computer-readable medium set forth in claim 7, wherein editing the transcript further comprises removing the data items for the selected word and the adjacent word from the transcript.

12. A computer-implemented method comprising:
providing, by a processor, an interface displaying at least a portion of a transcript, the interface configured to receive a command selecting one of a plurality of words of the transcript and a desired edit from a plurality of permitted edits to the transcript, wherein the command is restricted to selection of a single word, wherein the plurality of permitted edits is restricted to prevent edits to a plurality of time index markers associated with the transcript;
receiving, by the processor, data via the interface selecting a word from the transcript and the desired edit; and
editing, by the processor, the transcript in response to receiving the selection and the desired edit, wherein editing the transcript comprises editing only data relating to one or more of the word selected by the received selection and a word adjacent to the selected word.

13. The computer-implemented method set forth in claim 12, further comprising, in response to receiving the selection, providing a menu listing the plurality of permitted edits, the menu comprising providing the menu listing each of a delete command to delete of the selected word, an insert command to insert a new word adjacent to the selected word, and a merge command to merge the selected word with the word adjacent to the selected word.

14. The computer-implemented method set forth in claim 12, wherein providing an interface comprises displaying a plurality of words of the transcript in a text box.

15. The method of claim 12, wherein editing the transcript further comprises:
inserting a new word adjacent to the selected word in a sequence of words included in the data defining the transcript; and
setting duration data included in the data defining the transcript and associated with the new word to a value of zero.

16. The method of claim 12, wherein editing the transcript further comprises inserting a new word adjacent to the selected word by:
determining a time difference between a first time index marker corresponding to the beginning of the selected word and a second time index marker corresponding to the beginning of a word adjacent to the selected word;
inserting the new word adjacent to the selected word in a sequence of words included in the data defining the transcript; and
setting duration data included in the data defining the transcript and associated with the new word to a value equal to the time difference.

17. The method of claim 12, wherein editing the transcript comprises merging the selected word with an adjacent word by:
determining respective durations of the selected word and the adjacent word; and
creating a new data item comprising (i) the text of the selected word and the adjacent word combined, (ii) a time index marker corresponding to an earlier time index marker as between the selected word and the adjacent word, and (iii) an additional duration equal to the sum of the respective durations of the selected word and the adjacent word.

18. The method of claim 17, further comprising removing data items corresponding to the selected word and the adjacent word from the transcript.

19. The method of claim 12, further comprising:
receiving data indicating an edit to insert a new word into the transcript between the selected word and the word adjacent to the selected word;
determining a time difference between a first time index marker corresponding to the beginning of the selected word and a second time index marker corresponding to the beginning of the word adjacent to the selected word;
determining a first duration of the selected word and a new duration of the new word; and
in response to determining that the new duration is less than the sum of the first duration and the time difference, inserting the new word adjacent to the selected word.

20. A method comprising:
accessing, by a processor, data defining a transcript, the transcript representing a plurality of words of an audio recording, wherein the accessed data includes the words of the transcript and a timestamp for each word;
receiving, by the processor, data indicating a selection of a first word of the transcript;
receiving, by the processor, data indicating an edit to insert a new word into the transcript between the first word and a second word adjacent to the first word;
determining, by the processor, a time difference between a first time index marker corresponding to the beginning of the first word and a second time index marker corresponding to the beginning of the second word;
determining, by the processor a first duration of the first word and a new duration of the new word; and
in response to determining that the new duration is less than the sum of the first duration and the time difference, inserting the new word adjacent to the first word.

21. The method of claim 20, further comprising:
providing an interface displaying at least a portion of the transcript, the interface configured to receive a command identifying a selected word of the transcript and a desired edit from a plurality of permitted edits to the transcript, wherein the command is restricted to selection of a single word;
receiving data via the interface indicating a selection of the first word and the desired edit; and
in response to receiving the selection and the desired edit, editing the transcript, wherein editing the transcript comprises editing only data relating to one or more of the first word and the second word adjacent to the first word.

* * * * *